United States Patent

[11] 3,591,896

| [72] | Inventor | Richard A. Tartaglia<br>Essex Fells, N.J. |
|---|---|---|
| [21] | Appl. No. | 875,972 |
| [22] | Filed | Nov. 12, 1969 |
| [45] | Patented | July 13, 1971 |
| [73] | Assignee | Peerless Tube Company<br>Bloomfield, N.J. |

[54] MACHINE FOR MOLDING AND SECURING ON PLASTIC TUBES END WALLS HAVING THREADED-CLOSURE NECKS
15 Claims, 22 Drawing Figs.

[52] U.S. Cl. .................................................. 18/19 TE,
18/20 C, 18/5
[51] Int. Cl. ................................................ B29c 17/00
[50] Field of Search.......................................... 18/19 TE,
20 C, 20 RR, 20 S, 20 P, 5

[56] References Cited
UNITED STATES PATENTS

| 2,983,959 | 5/1961 | Shapero et al. | 18/20 PX |
| 3,047,910 | 8/1962 | Downs | 264/153 |
| 3,058,150 | 10/1962 | Makowksi | 18/20 CX |
| 3,121,917 | 2/1964 | Swartz | 18/20 C |
| 3,270,117 | 8/1966 | Hobson | 18/19 TE X |
| 3,374,500 | 3/1968 | Drenning | 18/20 P X |
| 3,466,707 | 9/1969 | Click et al. | 18/19 TE |
| 3,475,786 | 11/1969 | Pearson | 18/19 TEX |

*Primary Examiner*—J. Howard Flint, Jr.
*Attorney*—Harry B. Rook

ABSTRACT: At one station a mandrel carried by a turret has slid thereon a preformed thermoplastic tube; at another station a slug is die-cut from a strip of heat-softened thermoplastic material and simultaneously pressed into one end of said performed tube; at another station at cavity die on the turret is moved laterally into alignment with a die on said mandrel and the soft slug is molded between the dies under constantly applied pressure generated by a locked toggle and spring combination to form an end wall for said tube having an exteriorly screw-threaded neck; at another station the toggle is unlocked and the mandrel die is withdrawn while said tube is held in the cavity die; at another station the mandrel is automatically rotated with the completed tube thereon to unscrew the neck from the second-mentioned die, and finally the tube is pulled automatically off the mandrel.

INVENTOR.
Richard A Tartaglia
BY
Harry B Cook
ATTORNEY

MACHINE FOR MOLDING AND SECURING ON PLASTIC TUBES END WALLS HAVING THREADED-CLOSURE NECKS

BACKGROUND OF THE INVENTION

1. Field of the Invention

The invention relates to the manufacture of a tubular thermoplastic container having a molded end wall formed with an exteriorly screw-threaded neck.

2. Description of the Prior Art

U.S. Pat. No. 3,047,910 discloses the welding of a heat-softened slug in a thermoplastic tube and the molding of said slug in a mold comprising two sections one of which is on a tube-supporting mandrel, to form an end wall having an exteriorly screw-threaded neck. In the machine for producing the container the mandrel die cooperates with a multiple part mold section the parts of which are separable for releasing the screw-threaded neck. This is a complicated and slow operation and leaves mold marks on the threads and also it is difficult to maintain the desired pressure of the mandrel mold section on the heat-softened material in the multiple part section.

The prior art also shows turret-type machines wherein material feeding and molding operations, including the formation of screw thread, are performed at successive stations.

In the machine shown in U.S. Pat. No. 2,994,107 one section of a two-section mold is momentarily laterally offset from the other section to permit insertion of a preformed tube and with withdrawal of the molded piece. However, the mold sections are locked together during injection of plastic material between the sections, and the sections are moved while locked together away from the injection apparatus. This is a complicated and expensive apparatus and the die-locking mechanism does not allow compensation for the shrinking of the material during hardening.

It is also known to releasably lock two sections of a mold together with a toggle mechanism, but the toggles do not reliably clamp the mold sections with the desired or satisfactory pressure, and the toggle mechanism is complicated and expensive.

Some machines also include means for unscrewing a screw-threaded neck from a one-piece mold or die section, for example, as shown in U.S. Pat. No. 3,109,198 and No. 2,958,898, but the mechanism is complicated, expensive and difficult to maintain in satisfactory operation.

SUMMARY

A primary object of the present invention is to provide a simple relatively inexpensive and reliable automatic machine for making on a mass production basis, thermoplastic tubular containers of the type shown in U.S. Pat. No. 3,047,910.

The invention contemplates a turret or indexing mechanism carrying a plurality of circumferentially spaced-apart mandrels; means at one station for applying to each mandrel a preformed thermoplastic tube; means at a subsequent station for feeding a ribbon of heat-softened plastic material and for cutting a slug from said ribbon and pressing it into one end of said tube, molds each comprising cooperative dies or mold sections on said mandrel and on said turret, respectively, with means for moving the mandrel die toward and from the other die and for moving said other die momentarily out of cooperative alignment with the mandrel die to facilitate the applying and the removing of the tube to and from the mandrel, respectively. The machine of the invention also comprises means including a toggle and spring combination for pressing and locking said mandrel die under spring pressure in cooperative molding relation to the other die to mold an end wall with a screw-threaded neck on said tube, and means for automatically locking each toggle at one station and for unlocking the toggle and withdrawing the mandrel at a subsequent station. Means for rotating said mandrel automatically is located at another station to unscrew said molded neck from the die; and there is means at a final station for pulling the completed container off the mandrel. The invention makes possible a one-piece die section for molding the slug, and simple means for unscrewing the complete container, and in addition the toggle and spring combination with the locking and unlocking mechanisms provide for quick application and maintenance of constant pressure on the plastic material and quick release of the pressure which ensures accurate molding and compensation for material shrinkage. The mechanism for unscrewing the completed container from the mold is simple and inexpensive. The machine as a whole is reliable, capable of rapid production, and requires a minimum of operator's attention and maintenance.

BRIEF DESCRIPTION OF THE DRAWING

For a complete understanding of the invention, reference should be had to the following description in conjunction with the accompanying drawings.

The machine of the invention includes a large number of parts many of which in true plan and elevational views, as well as sectional views, are obscured by other parts, and therefore in the views of the whole machine many parts are omitted so that others may be seen. Also the machine includes a plurality of subcombinations, for example, feeding mechanism for the tubes, mechanism for inserting the slugs into the tubes, the toggle operated dies and mechanism for removing the completed tubes from the dies; therefore each subcombination is shown schematically by itself with the parts relatively displaced from their normal positions in the assembled machine.

Referring in more detail in the drawings:

FIG. 6 is a fragmentary schematic composite elevational and sectional view of one of the toggle mechanisms and the actuating device for moving and locking the mandrel die in molding relation to the other die or mold section;

DESCRIPTION OF THE PREFERRED EMBODIMENT

As hereinbefore indicated the machine includes a turret that is generally designated by the reference character A. The turret is shown as comprising two end plates 1 and 2 connected together by tie rods 3 and carried by a tubular shaft A' which is horizontally journaled in bearing standards B and C rigidly mounted on the base D of the machine frame.

The turret is rotated intermittently or step-by-step by, for example, a Geneva gear, only partially shown and designated E, which is driven by a gear 4 meshing with a pinion 5 connected to one pulley of a speed-reducing belt and pulley drive F which is connected by another belt and pulley drive G to an electric motor H.

One turret plate has mounted thereon and equidistantly spaced apart in a circular row that is concentric with the turret, a plurality of mandrels I, in the present instance 12 mandrels, whose axes are parallel to the axis of rotation of the turret, each mandrel to removably support a plastic tube J. Each mandrel carries one die or mold section 6 to coact with another mold section or die 7 which is mounted on a tie rod near the other turret plate for molding the slug as a screw-threaded end wall for said tube. Upon rotation of the turret step-by-step the mandrels are moved in succession to a first tube feeding and applying station K, a second station L at which the plastic slug is cut and inserted into the tube, a third station M where the mold is closed, i.e. the two dies are locked in molding relation to each other, a fourth station N where the dies are unlocked and separated, a fifth station O where the screw-threaded tube is unscrewed from the mold section or die, and a sixth station P at which the tube is pulled off the mandrel.

Figure 2:
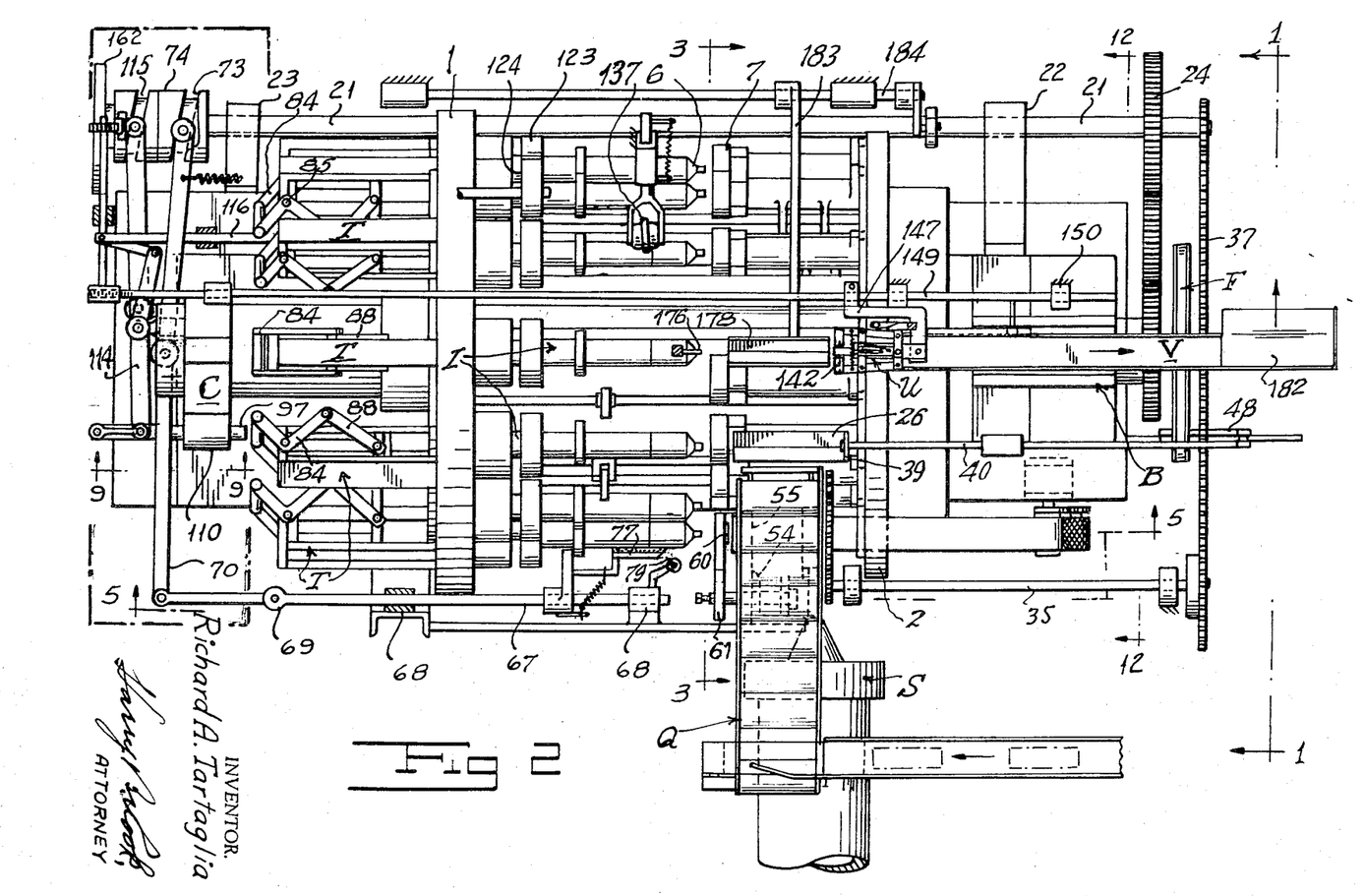
FIG. 2 is a schematic top plan view of the machine taken approximately from the plane of the line 2–2 of FIG. 1 and with parts omitted for clearness of illustration.
Figure 2A:
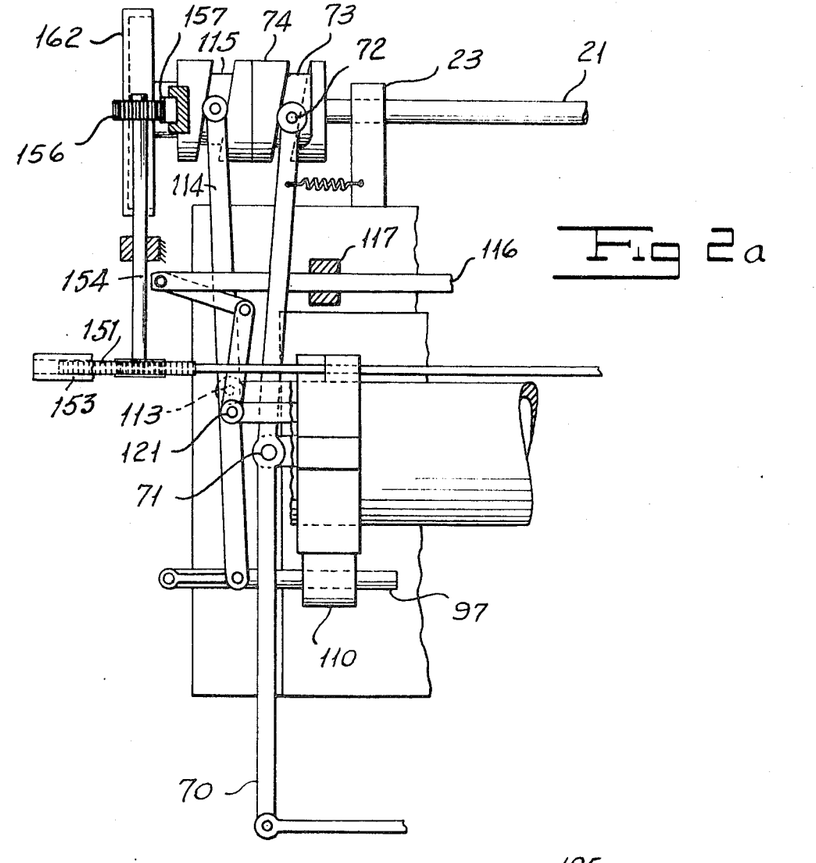
FIG. 2a is an enlarged fragmentary view of the portion of FIG. 2 that is enclosed in the rectangle shown by dot and dash lines.
Figure 3:
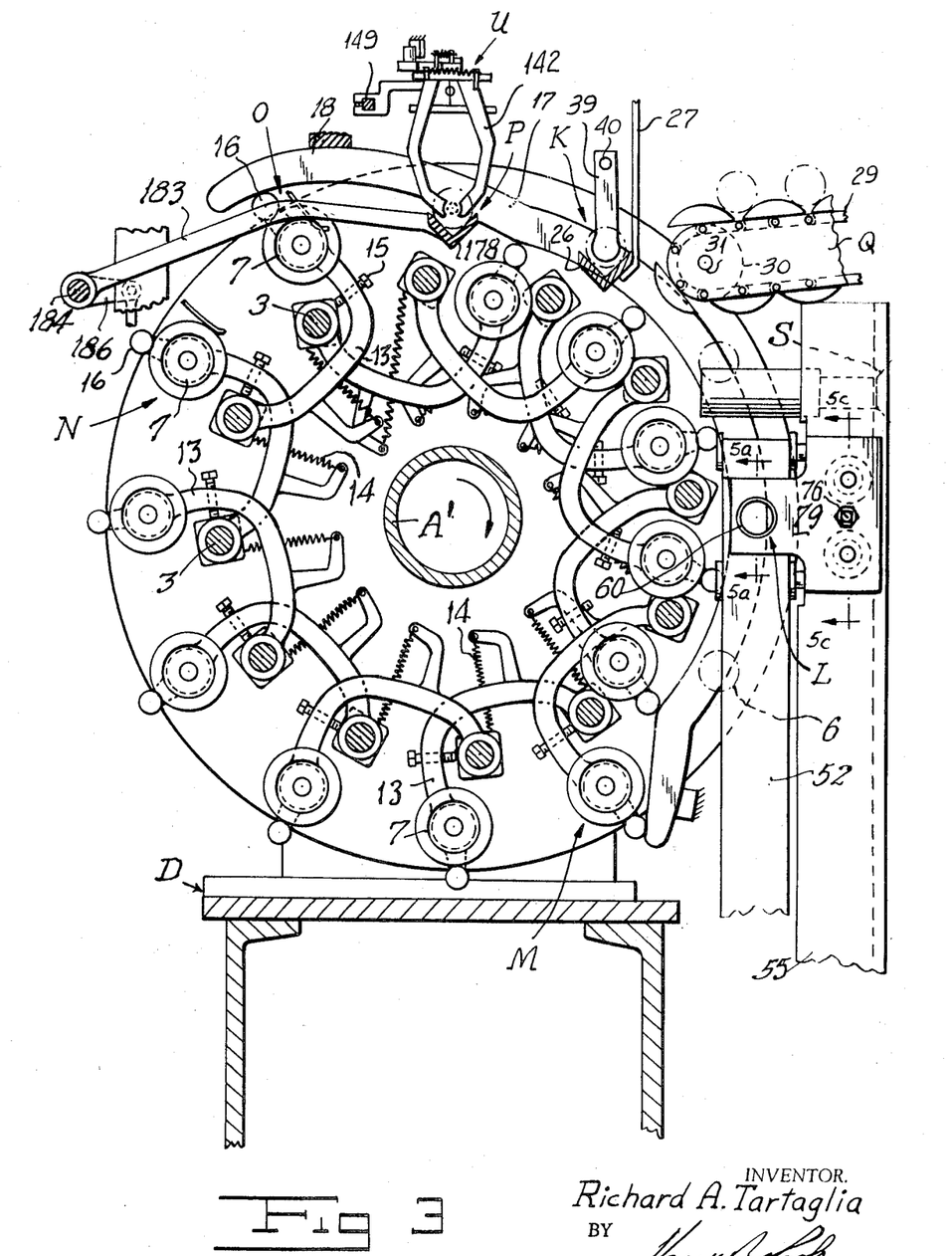
FIG. 3 is a schematic transverse vertical sectional view approximately on the plane of the line 3–3 of FIG. 2 with some parts omitted and other parts shown in elevation.
Figures 7, 8, 9:
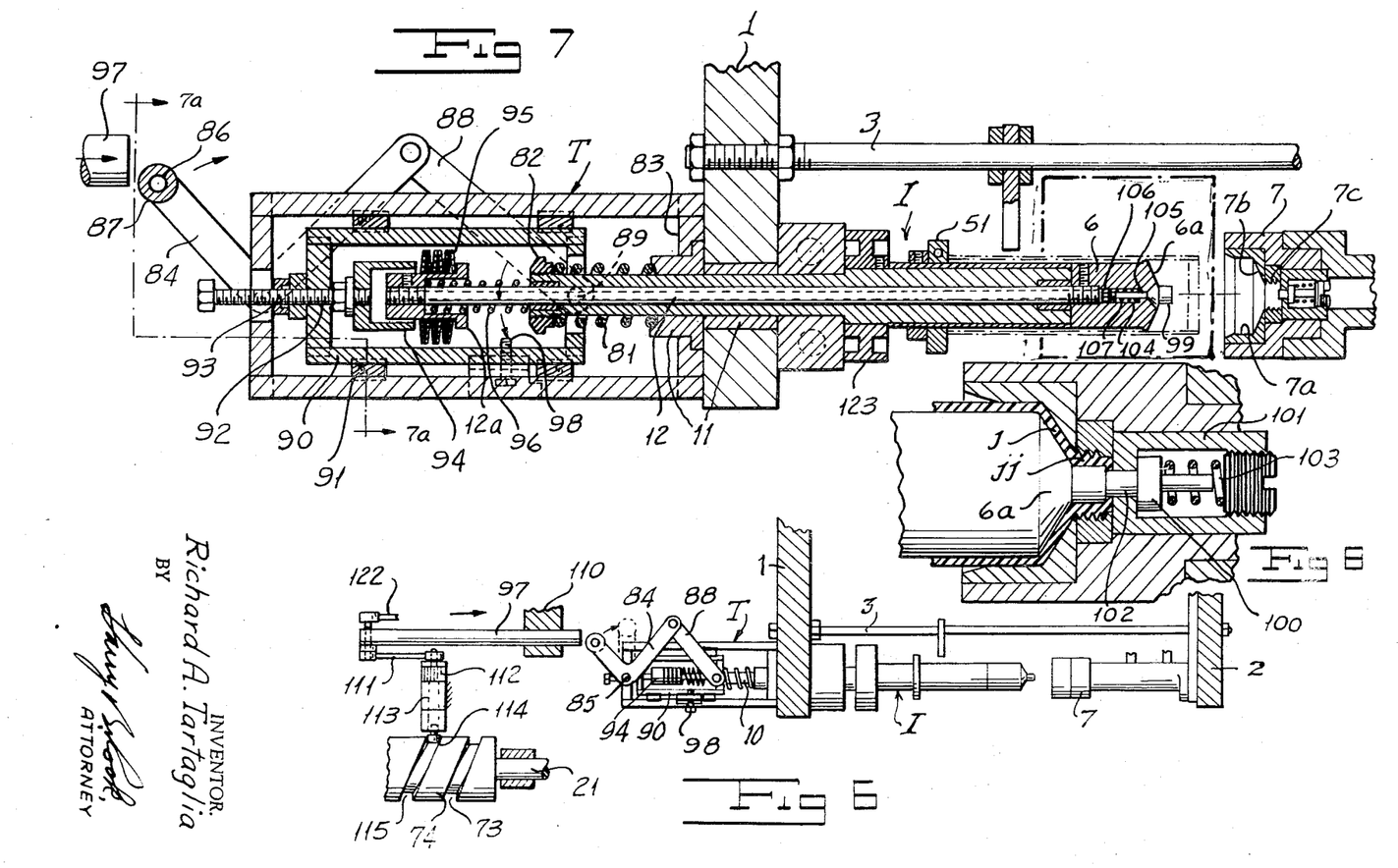
FIG. 7 is a greatly enlarged central vertical sectional view through the toggle mechanism in unlocked condition, with the tube-supporting mandrel mold section and the other mold section in separated relation to each other.
FIG. 8 is a fragmentary enlarged view of the two mold sections in molding relation to each other with the molded plastic material between them; 8 is a fragmentary enlarged view of the two mold sections in molding relation to each other with the molded plastic material between them.
FIG. 9 is a view similar to FIG. 6 showing the toggle mechanism in mold-locking position in solid lines and also showing the apparatus for unlocking the toggle.

Now referring more particularly to the mandrels and dies, and the mechanism for actuating the dies into and out of molding relation to each other, the mandrels are identical, and only one thereof need be described in detail. Referring to FIGS. 2, 6, 7, 9 and 10, each mandrel is shown as comprising a tubular body portion 10 which is rotatably and longitudinally slidably mounted in a bearing 11 secured in the end plate 1 of the turret. The body portion 10 extends entirely through the end plate 1 and the end portion thereof that projects toward the other end plate 2 which is formed to receive with a slide fit a preformed thermoplastic tube J. Longitudinally slidably mounted in the tubular body 10 is a rod 12 both ends of which extend beyond the corresponding ends of the body 10. Mounted on the end of the rod that extends toward the other turret end plate 2 is a punch die block 6 which cooperates with a cavity die 7 which has one or more arms 13 that are pivotally mounted on one of the tie rods 3 adjacent the turret end plate 2 so that the end of the die may slidably abut the inner face of the turret plate as best shown in FIG. 9. A tension spring 14 connected between one of the arms 13 and one of the adjacent tie rods 3 as best shown in FIGS. 3 and 9, normally biases the die into the coaxial alignment with the corresponding punch die, movement of said arm and die being limited by engagement of a setscrew 15 threaded in the arm 13 and abutting an adjacent tie rod as best shown in FIG. 3. It is necessary that the die 7 be momentarily moved out of axial alignment with the punch die to permit the preformed plastic tube to be slid onto the mandrel, and for this purpose a follower roller 16 is journaled on each die 7 to coact with a stationary cam bar 17 (FIGS. 2 and 3). The cam bar is rigidly mounted in any suitable manner on portions 18 and 19 of the machine frame which are shown fragmentarily in FIG. 3 and are omitted in FIG. 2.

When the turret is rotated by the driving mechanism including the Geneva gear in the direction of the arrow in the shaft A' of FIG. 3, each die 7 is moved from axial alignment with the mandrel at the fifth station O shown at the upper left-hand portion of FIG. 3 out of axial alignment with the mandrel at the tube-feeding first station K where the preformed plastic tube is slid onto the mandrel as hereinafter described. Upon continued movement of the turret in the same direction, the cavity die 7 remains out of alignment with the mandrel so that the slug may be cut and inserted into the tube at the slug forming and inserting second station L shown at the right-hand side of FIG. 3. Then the die 7 is permitted to swing back under the influence of the spring 14 into axial alignment with the mandrel as shown at the die-closing third station M at the lower right-hand side of FIG. 3 where the dies are locked in molding relation to each other. The dies remain locked together during several steps of rotation of the turret until the dies reach the die-separating fourth station N where the dies are unlocked and separated, after which the dies are moved to the tube-releasing fifth station O where the completed tube is unscrewed from the die 7, following which the completed tube is pulled off the mandrel at the tube-removing sixth station P.

The mechanisms at the several stations are activated by a main cam shaft 21 which is journaled in bearings 22 and 23 on the main frame and is driven through a train of gears including a gear 24 on the shaft 21, an idler gear 25 journaled on the standard B and the gear 4 which as hereinbefore described is driven by the pinion 5.

Figure 1:
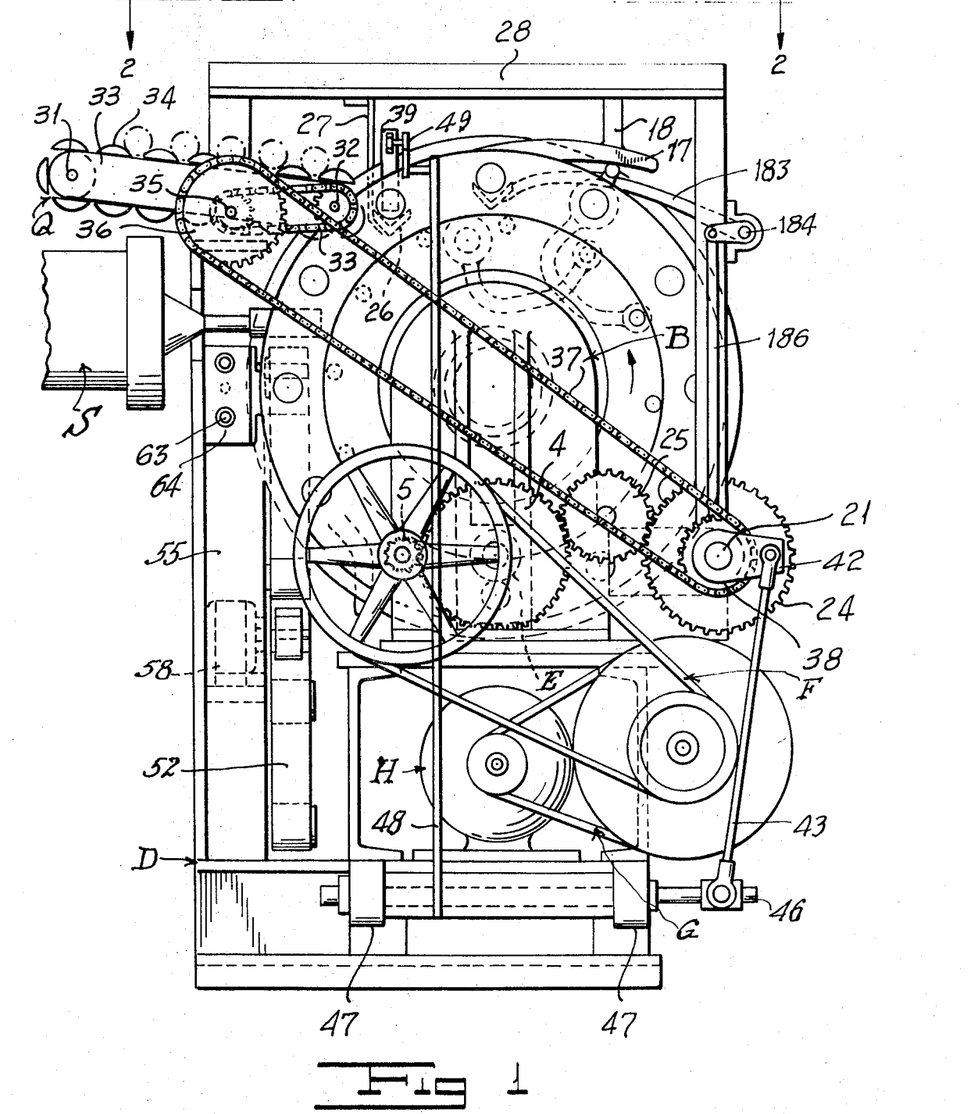
FIG. 1 is a schematic elevational view of one end of the machine with parts omitted for clearness in illustration approximately from the plane of the line 1–1 of FIG. 2.
Figure 4:
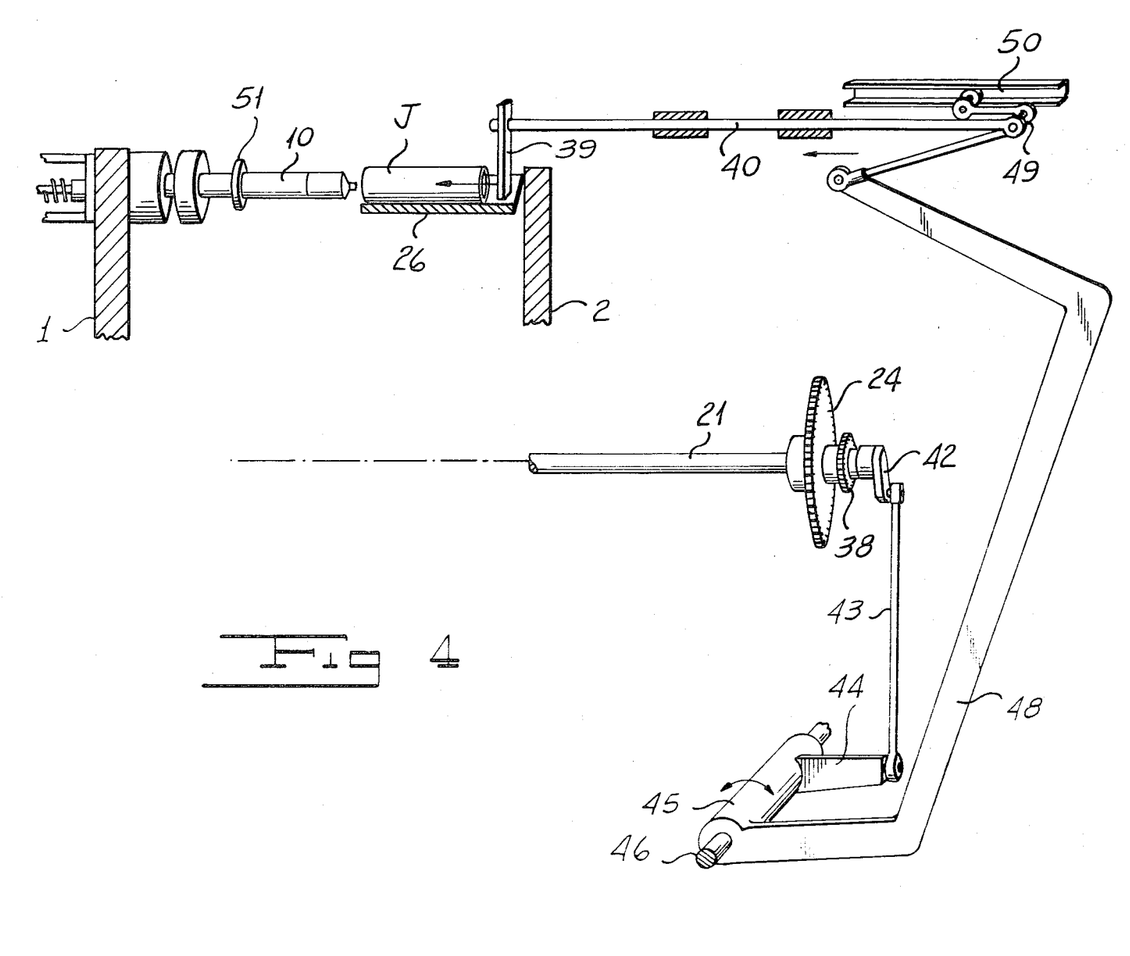
FIG. 4 is an enlarged fragmentary schematic view partially in vertical section and partially in elevation, showing the mechanism for applying the preformed plastic tube to the mandrels and separated from the other parts of the machine.

Referring first to the tube feeding station K, a trough 26 is mounted in any suitable manner on the main frame, for example, by a bracket 27 secured to and depending from a frame bar 28. The trough is permanently located so that as each mandrel comes to rest at the first station it will be in alignment with the trough. The preformed plastic tubes are fed in succession into the trough in timed relation to the rotation of the turret, by any suitable means such as an endless conveyor Q (FIGS. 1, 2 and 3) which is shown as comprising endless chains 29 running on sprockets 30 which are mounted on shafts 31 and 32 journaled in a subframe 33 and carrying flights 34 between which the tubes are deposited from a suitable source, for example, by an endless belt conveyor R and drops by gravity into the trough. The conveyor chains are driven by a chain and sprocket connection 33 between the shaft 32 and a shaft 35 on which is mounted a sprocket 36 connected by a chain 37 to a sprocket 38 on the main cam shaft 21. After a tube has been deposited in the trough it is slid onto the mandrel that is located at the first station K, by a pusher finger 39 mounted on a rod 40 which is reciprocably mounted in bearings 41 on the main frame and is actuated by a mechanism that is schematically shown in FIG. 4 of the drawings. As shown, one end of the main cam shaft 21 has a crank 42 which is connected by a link 43 to an arm 44 projecting from a sleeve 45 rigidly secured on a countershaft 46 which is journaled in bearings 47 on the base of the main frame (FIG. 1). The sleeve also has a long angular arm 48 which projects upwardly and has its upper end pivotally connected to the rod 40 by a lost motion linkage 49 which compensates for the arcuate swing of the arm 48 and the rectilinear motion of the rod, the linkage being supported by a guide channel 50 secured on the main frame. In FIG. 4 the parts are shown in their normal position when a mandrel is located at the first station K and a preformed tube is disposed in the trough 26, the pusher finger 39 being disposed at the end of the tube opposite the mandrel; and while the turret is at rest, the arm 48 is swung by the cam shaft 21 and the intermediate linkage 43—45 to the left, in the direction indicated by the arrow to slide the tube onto the mandrel, until the leading end of the tube abuts a stop collar 51 on the mandrel and the other end of the tube extends beyond the die 6 on the mandrel, whereupon the pusher finger is returned to its normal position.

Figures 5, 5A, 5B:
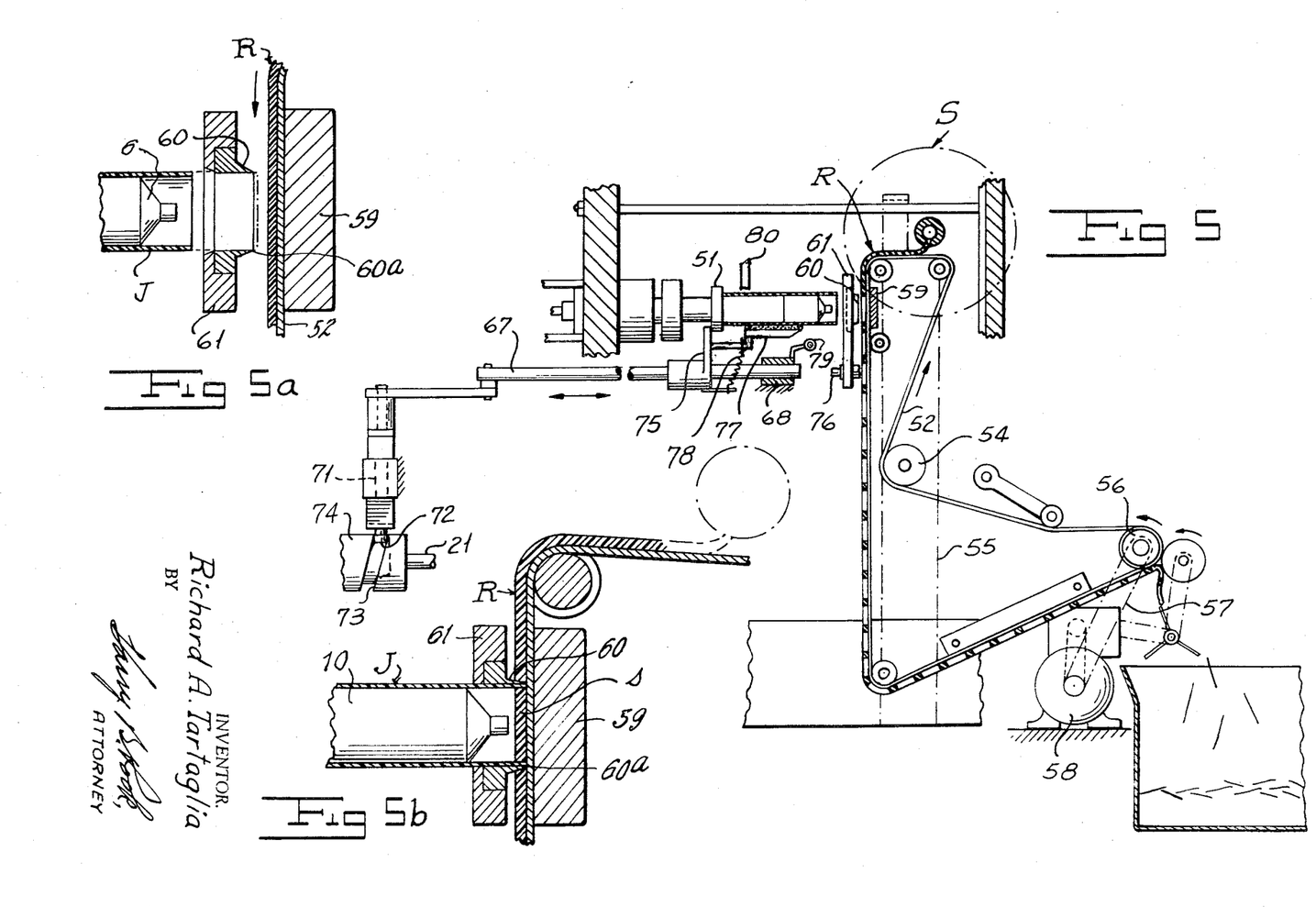
FIG. 5 is a fragmentary vertical sectional view approximately from the plane of the line 5–5 of FIG. 2 with portions of the mechanism for pushing the mandrel and tube rotated 90° for clarity and showing the mechanism for cutting the slug or disc of thermoplastic material and for applying the disc to the end of a preformed thermoplastic tube.
FIG. 5a is an enlarged fragmentary vertical sectional view approximately on the plane of the line 5a–5a of FIG. 2 showing the parts in their positions immediately before the disc cutting operation.
FIG. 5b is a similar view showing the insertion of the disc into the tube.
Figure 5C:
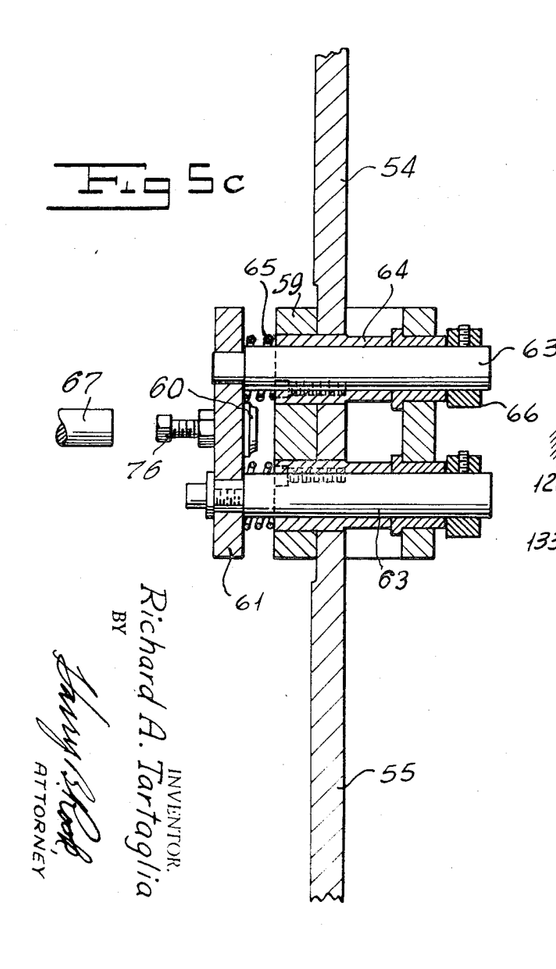
FIG. 5c is an enlarged fragmentary sectional view on the plane of the line 5c–5c of FIG. 3.

Then the tube is carried idly on the mandrel during the next step of rotation of the turret, and during the next following step the mandrel bearing tube is moved to the second slug forming and inserting station L. At this station a ribbon R of heat softened thermoplastic material is extruded from a known type of extruder S onto an endless belt 52 running over guide rollers 53 and 54 mounted on a vertical frame stanchion 55 so as to provide a substantially vertical reach that is disposed in spaced and opposed relation to the free end of the mandrel (FIGS. 2 and 5). The ribbon adheres to the belt which is shown as driven by a pulley 56 having a chain and sprocket connection 57 with an electric motor 58 which is mounted on a fixed support. A platen 59 is fixedly mounted on the stanchion 55 and abuts the side of the belt opposite the ribbon so as to coact with a tubular cutter 60 the opening through which is such diameter as to slidably receive the projecting end of the preformed tube J (FIGS. 5a and 5b). The cutter is shown as mounted on a plate 61 which is carried by guide rods 63 which are slidable in bearings 64 fixedly mounted with respect to the stanchion 55 and the platen 59 (FIGS. 2, 3, 5 and 5c). As best shown in FIGS. 2 and 3, the cutter is in offset relation to the guide rods 62 in juxtaposition to the platen and normally held in spaced relation to the belt by springs 65 which normally bias the plate 61 into its normal position, which position is variable by adjustment of stop collars 66 on the guide rods (FIG. 5c).

While the mandrel is located at station L, the mandrel and tube are slid longitudinally to slide the free end of the tube into the cutter whereupon the circular cutting edge 60a of the cutter and the tube are forced through the ribbon with the end of the tube slightly ahead of the cutting edge so as to form a slug s and to push the end of the tube into encircling contact with the slug. According to the invention the heat in the slug causes the slug to adhere to the interior surface of the tube. Means for accomplishing this result is shown as comprising a horizontal actuating rod 67 mounted in fixed bearings 68 (FIG. 2) and pivotally connected to a link 69 which is also pivotally connected to one end of a lever 70 which is pivotally mounted at 71 intermediate its ends on the machine frame and has at its other end a follower roller 72 which follows a cam groove 73 in a cam block 74 which is fixedly connected to the main cam shaft 21 (FIGS. 2 and 5). On the rod 67 is mounted an arm 75 which coacts with the collar 51 on the mandrel for pushing the mandrel and the tube in the direction to form the slug, the mandrel and tube being returned in the other direction by a spring to be hereinafter described, and the rod 67 being moved in the other direction by the actuating lever 70 and cam 72, 73. In order to ensure positive action of the cutter, the end of the rod 67 engages an adjustable abutment screw 76 on the plate 61.

To ensure that the tube shall move backwardly with the mandrel and become disengaged from the ribbon, it is desirable to provide a presser bar 77 having a cushioned face and normally influenced away from the mandrel by a spring 78 so that the tube can be freely slipped onto and off the mandrel. The presser bar moves with the arm 75, and rides upon a spring mounted roller 79 as the tube enters the ribbon, thereby to firmly press the presser bar against the tube so that the tube is firmly held against slipping on the mandrel as the tube is withdrawn from the ribbon. This ensures that the tube with the slug therein shall be disengaged from the ribbon in preparation for the operation at the next step of movement of the turret.

Now referring to the mechanism for locking the dies in molding relation to each other, the tubular body 10 of the mandrel is normally urged into its normal position by a spring 81 (FIGS. 6 and 7) that is interposed between an adjustable collar 82 on the mandrel body and one end plate 83 of a cradle T that is rigidly secured to the outer side of the turret plate 1 and on which is pivotally mounted two toggles for closing and opening the dies. Each toggle includes a bellcrank 84 pivotally mounted intermediate its ends at 85 on one side of the cradle and having one arm rigidly connected to the corresponding arm of the other bellcrank by a bolt 86 on which is a roller 87. The other arm of each bellcrank is connected to one end of a link 88 the other end of which is pivotally connected at 89 to one side of a slide 90 which is slidably mounted in the cradle T on bearing blocks 91. Adjustably mounted in one end of the slide as by a screw 92 and a lock nut 93, is a cup-shaped pusher 94 to coact with a series of concavoconvex disc springs 95 which are mounted on a bushing 12a adjustably secured on the end of the rod 12 opposite the mandrel die 6. The springs 95 are interposed between a shoulder on the bushing 12a and the end of the pusher 94. A spring 96 stronger than the spring 81 is interposed between the bushing 12a and the end of the mandrel body 10 and normally urges the die 6 into its normal position abutting the end of the mandrel body.

Figure 7A:
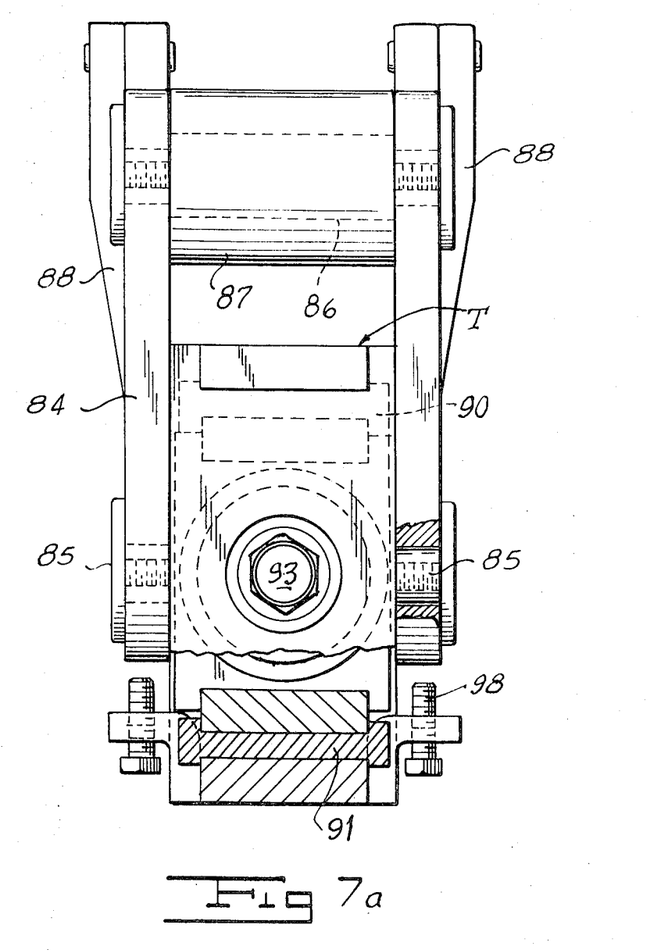
FIG. 7a is a further enlarged composite vertical sectional view and end elevation of the toggle mechanism taken from approximately the plane of the line 7a–7a of FIG. 7.
Figure 7B:
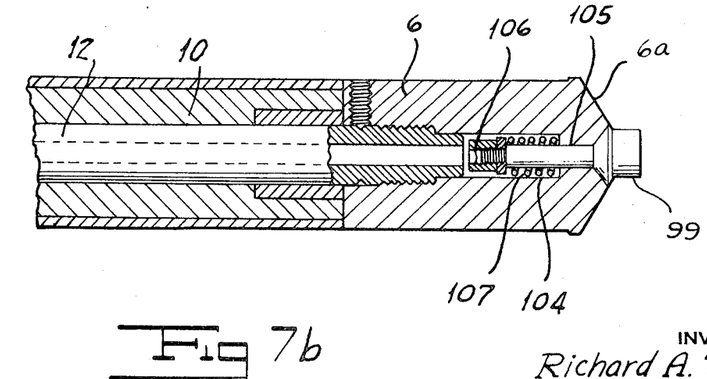
FIG. 7*b* is an enlarged fragmentary view of the portion of FIG. 7 enclosed in the rectangle formed by dot and dash lines in FIG. 7.
Figure 9:
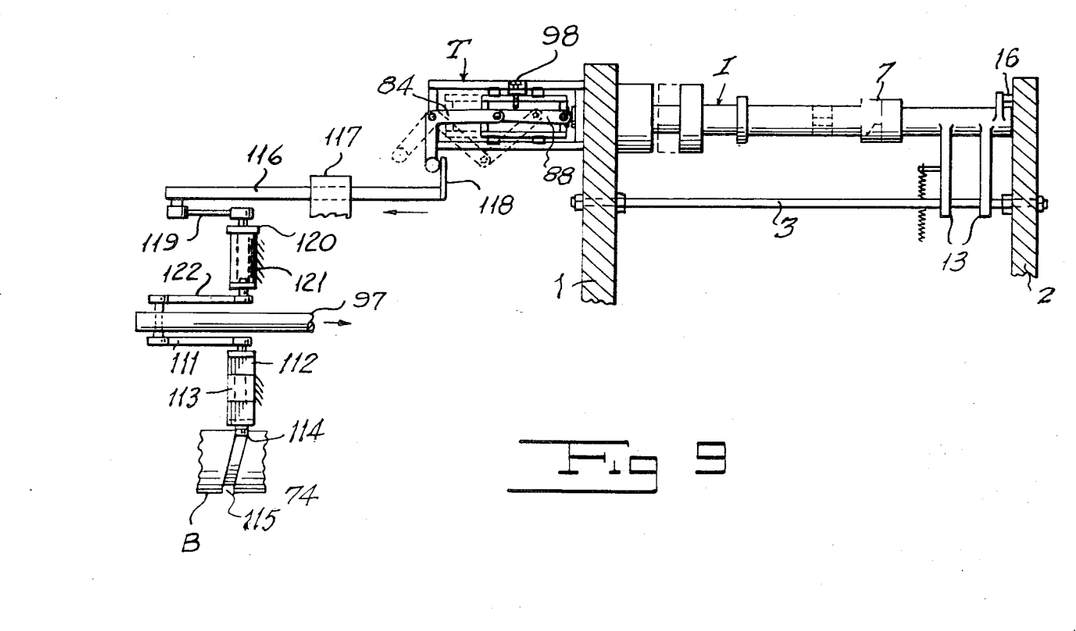
Figure 10:
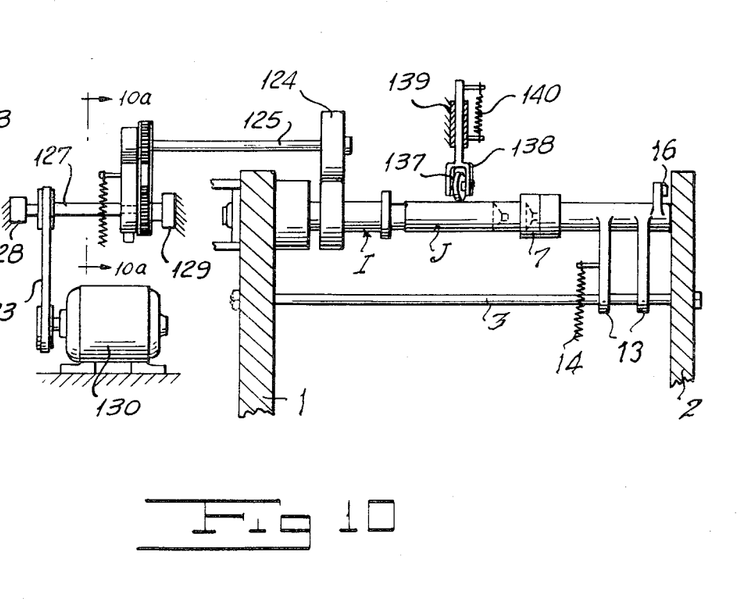
FIG. 10 is a schematic composite elevational and sectional view showing the mechanism for unscrewing the completed container from the mold section.
Figure 10A:
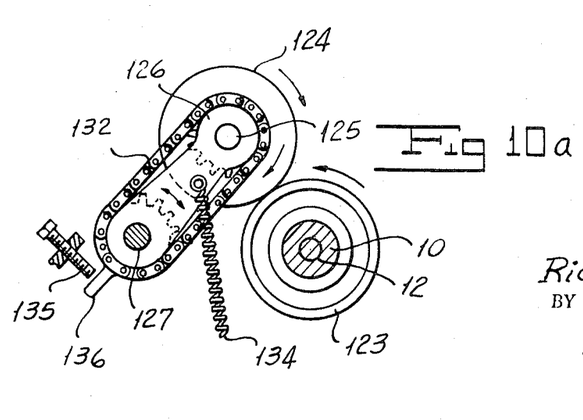
FIG. 10*a* is an enlarged fragmentary elevational view approximately on the plane of the line 10*a*–10*a* of FIG. 10, with the turret omitted.

When the mandrel carrying the tube having the slug in the outer end thereof is disposed at the third station M, the toggles are actuated in the direction indicated by the arrows in FIGS. 6 and 7 by engagement of a push rod 97 with the roller 87 (FIGS. 7, 7a) and the slide 90 is slid to the right so that the pusher 94 engages the springs 95, and the body 10 and rod 12 of the mandrel are moved together toward the cavity die 7. This movement continues until the collar 51 abuts a stop finger 80 adjustably mounted on an adjacent tie rod (FIGS. 6 and 7) to stop movement of the mandrel body, after which movement of the rod 12 and the die 6 continues until the slug is compressed between the dies, at which time the toggles become locked with the links 88 abutting stop screws 98. This locked position of the toggles is best shown in FIG. 9 which indicates the relation of the parts when the mandrel is in the fourth position during which the dies are unlocked and separated. During the molding operation, the pusher 94 constantly exerts pressure on the springs 95 so that the plastic material of the slug is maintained under constant pressure during the molding operation. This pressure compensates for any shrinkage of the material in the dies and ensures a compact condition in the molded material.

As hereinbefore stated, the slug is molded to form an end wall on the tube having an exteriorly screw-threaded neck, and for this purpose the mandrel die 6 is mounted on the rod 12 which is tubular and one end 6a of the die is so shaped as to form the interior surface of said end wall which is designated j (FIG. 8) when said surface 6a is in opposed spaced relation to the bottom surface 7b of the cavity 7a. A neck forming punch 99 projects from the center of the surface 6a to coact with a screw-threaded recess 7c in the die cavity to form an exteriorly screw-threaded neck jj. Cooperating with the punch 99 to form an opening in the end of the neck, is a punch 100. As shown, the punch 100 is mounted in a casing 101 which is mounted in the body of the die 7 with one end wall 102 forming the bottom of the recess 7c. One end of the punch is normally projected beyond said wall 102 by a spring 103 which permits the punch to yield under the pressure exerted by the compression of the soft material of the slug by the punch 99 as the mandrel die moves into molding relation to the cavity die as best shown in FIG. 8. Preferably the punch 99 is longitudinally movably mounted in the die 6 and as shown the die has a recess 104 and the punch has a shank 105 extending into the recess and having thereon a nut 106 between which and the bottom of the cavity is interposed a spring 107. This construction permits relative movement of the die 6 and the punch to facilitate withdrawal of the punch from the molded tube neck *jj*. The base of the punch seats in a shallow recess in the end of the die body and serves as a valve to permit the entrance of air into the space between the juxtaposed faces of the two dies during the separation of the dies, admission of the air being permitted by the opening through the tubular rod 12.

Now referring to the means for actuating the push rod 97, the push rod is reciprocably mounted in a suitable bearing 110 on the main frame and has its end opposite the toggles pivotally connected by link 111 to one end of a driving lever 112 which is pivotally mounted intermediate its ends in a bearing 113 secured on the frame and having at its other end a follower roller 114 for a cam groove 115 in the cam block 74 (FIGS. 2, 6 and 9). With this construction the lever 112 is oscillated so as to reciprocate the push rod in timed relation to the rotation of the turret and so as to thereby actuate the toggles of each mandrel as the mandrel reaches the third station M.

The dies 6 and 7 remain in locked molding relation to each other during several successive steps of movement of the turret until the mandrel reaches the fourth station N at which the dies are unlocked and separated. The means for causing separation of the dies includes a pull rod 116 (FIGS. 2 and 9) which is reciprocably mounted in a suitable bearing 117 and has one end formed with a finger 118 to engage behind the roller 84 of the toggle as shown by solid lines in FIG. 9. The other end of the pull rod is pivotally connected by link 119 to one end of a motion transmitting lever 120 which is pivotally mounted intermediate its ends on a bearing 121 secured on the machine frame and has its other end pivotally connected by a link 122 to the push rod 97. With this construction the motion of the push rod is transmitted to the pull rod which is thereby reciprocated in timed relation to the rotation of the turret. When a mandrel having a locked toggle reaches the fourth station N, the roller of the toggle is first disposed behind the finger 118 and upon movement of the pull rod in the direction indicated by the arrow, the bellcrank is swung so as to break the toggle as indicated by broken lines in FIG. 9. Immediately upon the breaking of the toggle, the spring 96 pushes the slide backwardly and pulls the die 6 out of the die 7 and the body 10 of the mandrel is retracted to its normal position by the spring 81 as shown by solid lines in FIG. 7. It will be noted that the screw-threaded neck *jj* of the completed tube remains connected to the mold 7 by the molded threads, and the mandrel slides through the tube.

The mandrel with the tube in this position is then moved to the fifth station 0 at which there is means for unscrewing the neck from the mold to release the tube. This means is shown as comprising a friction roller 123 mounted on and for rotation with the body 10 of the mandrel, with which a frictional driving connection is established by a friction driving roller 124 mounted on a shaft 125 which is journaled in one end of a bearing bracket 126 the other end of which is mounted on a shaft 127 which is journaled in bearings 128 and 129 on the main frame. The shaft 127 is shown as driven by an electric motor 130 through a belt and pulley connection 131, and the roller 123 is driven through a chain and sprocket connection 132 with the shaft 127. The bearing bracket 126 is normally biased in one direction by a spring 134 to locate the periphery of the driving roller 124 so that it will be engaged by the periphery of the roller 123 as the mandrel moves into station 0. Movement of the bracket under the influence of the spring and the normal position of the roller 124 are effected by an adjustable stop screw 135 mounted in the machine frame and adapted to be abutted by a finger 136 on the bracket 126. It will be understood that normally the tube will frictionally engage the mandrel so that when the mandrel is rotated by engagement of the roller 123 with the friction driving roller 124, the tube will be rotated with the mandrel and in such a manner that the threaded neck *jj* of the completed tube is unscrewed from the threads 7c of the cavity die.

For the purpose of enhancing the frictional engagement of the tube with the mandrel and to urge the tube longitudinally of the mandrel as the neck is unscrewed, a roller 137 is mounted in a yoke 138 with its axis of rotation oblique to the axis of the mandrel (FIGS. 2 and 10) and the yoke has a shank which is vertically slidably mounted in a bearing 139 on the main frame. The roller is yieldingly held in contact with the tube by a tension spring 140.

Upon removal of the completed tube from the cavity die 7, the cavity die is moved by the cam 17 out of alignment with the mandrel and into an out-of-the-way position as the turret rotates the next step to move the mandrel into position at the sixth station P where the tube is pulled off the mandrel.

Referring particularly to FIGS. 2, 3, 11, 12 and 13, when the mandrel bearing the completed tube reaches the station P, the tube neck is in horizontally spaced relation to a pair of pulloff jaws 142 of a pulloff mechanism U. The ends of the jaws are spaced apart a distance greater than the diameter of the threaded neck and approximately equidistantly from an extended line of axis of the neck. Each jaw is connected to and depends from one end of a horizontal lever 143 the other end of which is pivoted at 144 between support frame bars 145 secured on a support bar 146 to which is rigidly connected a bracket arm 147 which is clamped by a split clamp connection 148 to an actuating bar 149. Said bar is reciprocable longitudinally of the machine in suitable bearings 150 on the main frame and is connected to a driving mechanism generally designated V. This driving mechanism comprises a gear rack 151 on the bar 149 which meshes with a pinion 152 journaled in a fixed bearing housing 153 in which the bar 149 is also slidable. The pinion 152 in practice is a long pinion but for convenience in illustration and with particular reference to FIG. 2, the pinion is shown mounted on a horizontal shaft 154 that is journaled in the housing 153 and suitable bearings 155 and has connected thereto a pinion 156 which meshes with a vertical rack bar 157 slidably mounted in a suitable guide bearing 158 secured on a fixed support such as the machine frame. The lower end of the bar 157 has a longitudinal slot 159 through which passes the main cam shaft 21, and a follower roller 160 is mounted on the bar 157 to follow a cam groove 161 in a disc 162 which is mounted on and rotates with the shaft 21. With this construction the actuating bar 149 is reciprocated in timed relation to the rotation of the turret.

Figures 11, 11A, 12:
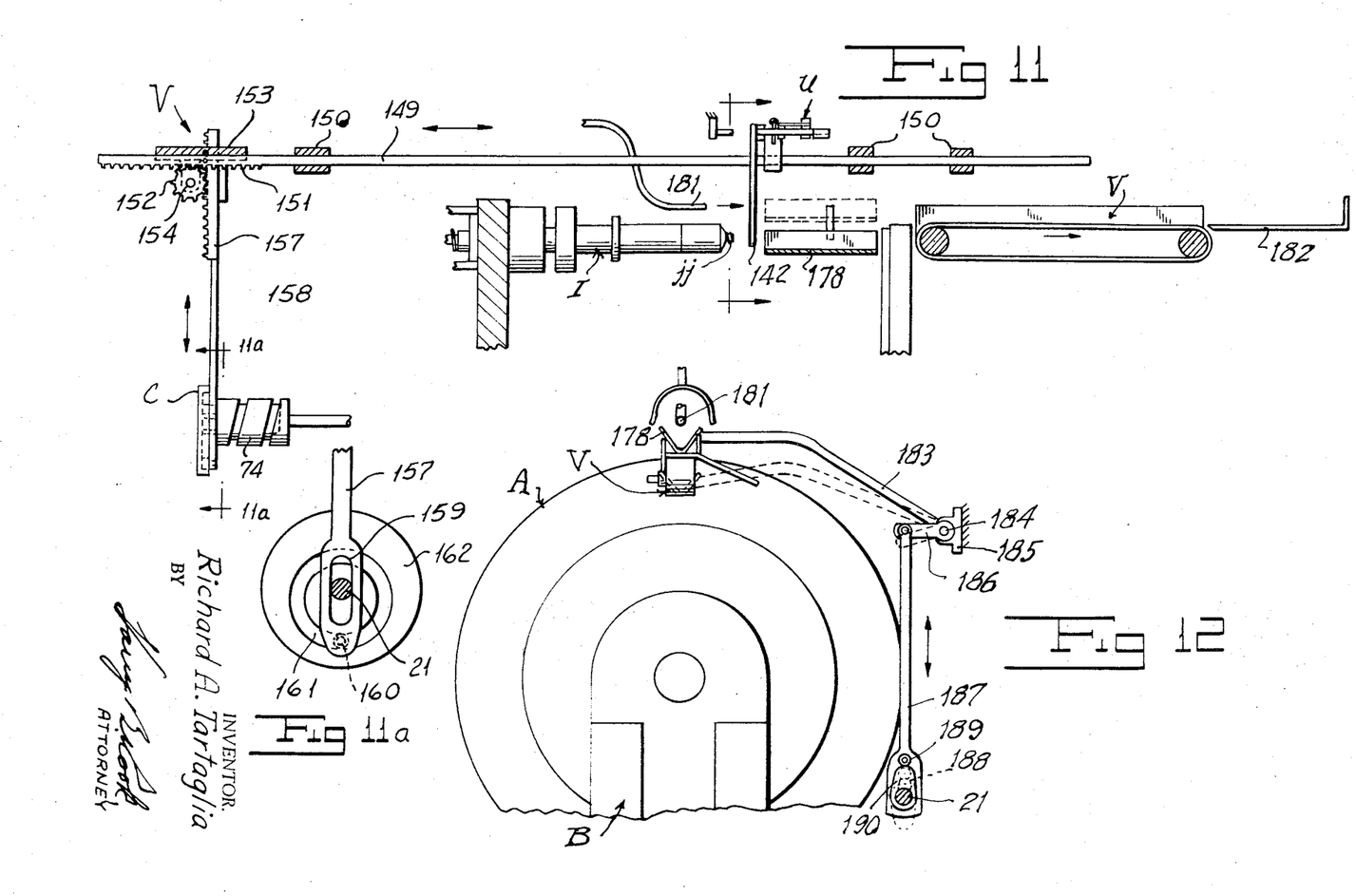
FIG. 11 is a schematic elevational view, partially in section, of the mechanism for pulling the completed container off the mandrel, with portions omitted for simplicity of illustration.
FIG. 11*a* is an enlarged fragmentary view approximately on the plane of the line 11*a*–11*a* of FIG. 11.
FIG. 12 is a fragmentary schematic elevation partially in section from the plane of the line 12–12 of FIG. 2, of the take away mechanism for the tube, with portions omitted.

The jaws 142 are normally held in spaced apart relation and in spaced relation to the end of the tube neck when the tube is disposed at station P as shown in FIGS. 3 and 11. The jaws are held in spaced relation to each other by toggle links 163 and 164 each of which has one end pivotally connected at 165 to its lever 143 and its other end pivotally connected to the other link by a pin 166 which extends through a slot 167 in the support bar and through a slot 168 in a toggle-actuating link 169 which is influenced in one direction into a normal position (FIG. 13) by a spring 170 one end of which is connected to a stud 171 on the link 169 while its other end is connected to a stud 172 secured in one of two frame bars 173 which are rigidly connected to the support bar 146 in vertically spaced relation to each other and guide the levers 143 between them. The toggle links are normally actuated into extended relation to each other by means about to be described, so as to move the jaws apart, and a spring 174 connects the two levers 143 and normally urges the levers and their jaws toward each other. For removal of the tube from the mandrel, the actuating bar is pushed in the direction to move the jaws 142 to a position at opposite sides of the tube neck, whereupon one end of a trip rod 175 which is slidably mounted in the support bar 146 strikes an abutment stud 176 fixed on the frame and the trip rod is slid and overcomes the resistance of spring 175a so as to abut and move the toggle pin 166 and initiate movement of the toggle links out of their normal extended relation to each other, whereupon the spring 174 snaps the jaws into gripping relation to the tube neck, and spring 175a returns rod 175.

The actuating bar is then moved in the opposite direction to pull the tube off the mandrel and return the jaws to a position to locate the tube above a discharge trough 178, whereupon the jaws are separated to release the tube by gravity into the trough. The means for separating jaws comprises a push lever 179 which is pivotally mounted between its ends on one of the pivot pins 144 and carries at its other end a roller which is coactive with a fixed cam 180 when the actuating bar positions the jaws over the trough 178 so as to push the toggle-actuating link from its normal position (FIG. 13) against the toggle pin 166 and thereby actuate the links into their extended relation to each other and abutting the frame bar 173 where they are yieldingly held by the spring 174 and with the jaws separated.

After the tube has dropped into the trough 178, the trough is elevated into a position above and at one end of an endless belt discharge conveyor V, onto which the tube is blown from the trough by a jet of air from a blow tube 181. The completed tubes in end to end file formation are pushed from the conveyor onto a discharge chute 182.

The mechanism for raising and lowering the trough 178 is shown as comprising an arm 183 to one end of which the trough is rigidly connected and the other end of which is connected to a countershaft 184 journaled in suitable bearings 185 on a fixed support such as the frame. The countershaft 185 has connected thereto a crank 186 which is in turn pivotally connected to one end of a link 187 the other end of which has a slot 188 through which passes the main cam shaft 21. A roller 189 is journaled on the link 187 and follows a cam crank 190 which is connected to and rotates with the main cam shaft. With this construction, the trough 178 is normally supported by the arm 183 is the position shown by dotted lines in FIG. 12, and the trough is elevated into the tube-delivery position, shown in solid lines, in timed relation to the rotation of the turret.

Figures 13, 14:
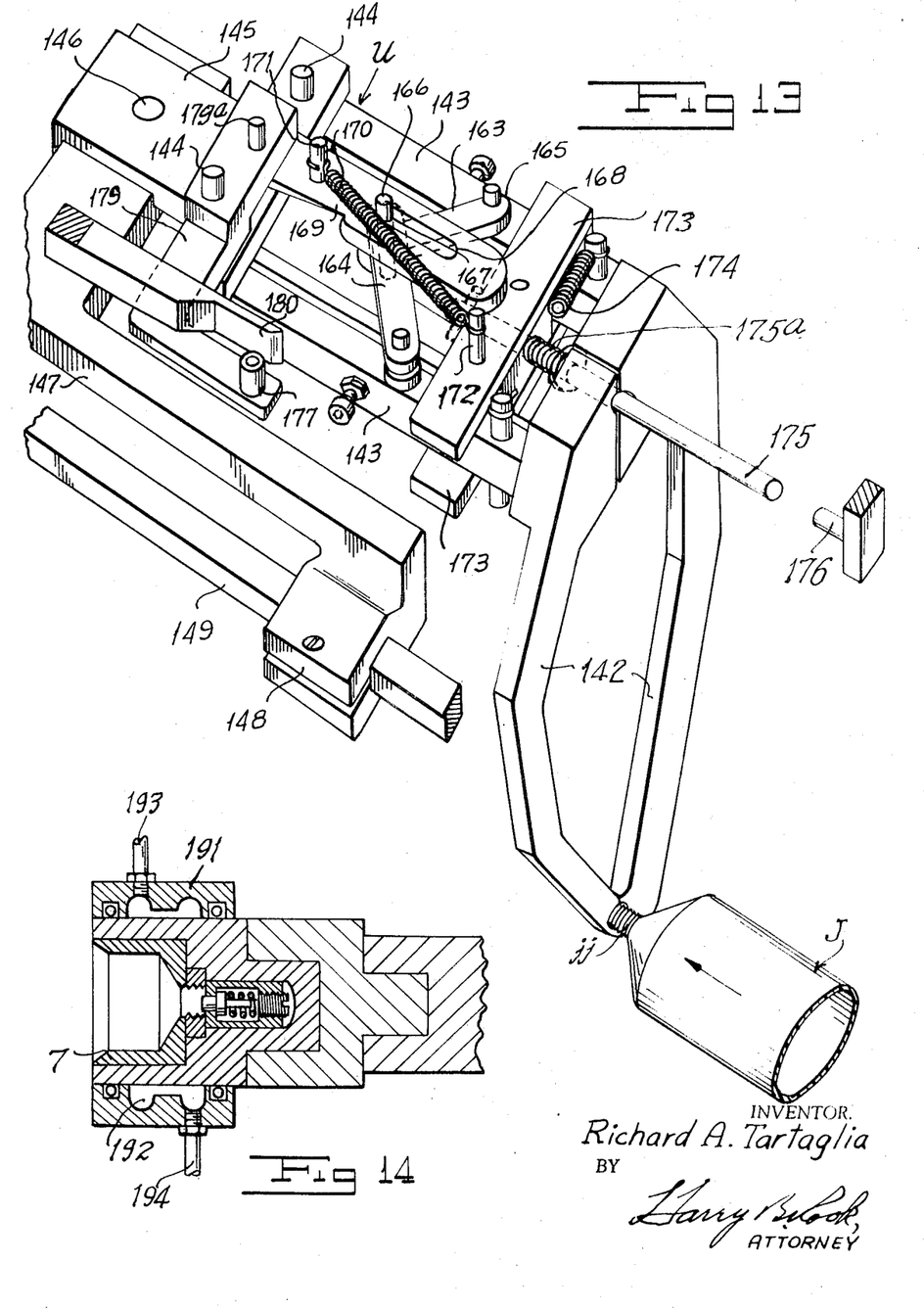
FIG. 13 is a greatly enlarged detached schematic perspective view, with portions omitted for clearness of illustration, of the container-gripping mechanism for pulling the completed container off the mandrel.
FIG. 14 is a view similar to FIG. 8 showing a modification of the mold section.

Should it be desired to cool the hot molded neck to expedite setting of the thermoplastic material, a cooling jacket 191 may be applied to the cavity die 7, as shown in FIG. 14. The jacket has a chamber 192 through which a cooling fluid may be circulated through inlet and outlet pipes 193 and 194.

I claim:

1. A machine for molding end walls on thermoplastic tubes, comprising a frame, a turret rotatably mounted in the frame, at least one mandrel mounted at one end on said turret with its axis parallel to the axis of rotation of the turret, means for rotating the turret step-by-step to move said mandrel through a plurality of stations in succession, means at the first station for applying a preformed thermoplastic tube to said mandrel, means at a second station for feeding a ribbon of heat-softened thermoplastic material and for cutting a slug from said ribbon and pressing the slug into one end of said tube, two cooperative dies to form a cavity between them for molding said slug into an end wall on said tube, the first die being disposed on the free end of said mandrel and the second die being movably mounted on said turret, means normally biasing the second die into coaxial opposed spaced relation to the first die, means on said frame cooperative with a part connected to said second die for moving said second die momentarily laterally out of coaxial relation to the first die prior to movement of said dies into said first-mentioned station to allow said tube to be slid onto said mandrel at said first-mentioned station, mechanism including said mandrel on the turret and actuating means at a third station for normally biasing the first die out of cooperative relation to the second die and for moving the first die into and locking it in cooperative relation to the second die, and trip means at a fourth station for actuating said mechanism to unlock and release said first die into its normal position.

2. A machine as defined in claim 1 wherein said second die is formed to mold a screw-threaded neck on said end wall, said mandrel is mounted for rotation, and with the addition of means for rotating said mandrel and tube to unscrew said screw-threaded neck out of said second die.

3. A machine as defined in claim 2 with the addition of means for pulling the completed tube with said molded end wall off the mandrel.

4. A machine as defined in claim 1 wherein said mandrel comprises a tubular body portion rotatable and longitudinally slidable in the turret and a rod longitudinally slidable in the body portion and having the first die at its free end, and said mechanism includes a slide mounted on the turret, spring means interposed between the turret and the mandrel body portion normally biasing said mandrel body portion into normal position, means including a spring interposed between said mandrel body portion and said slide for biasing said rod and die into normal position, a toggle including links pivotally connected together, one of which is pivotally connected to said slide and the other of which is pivotally mounted on a pivot which is carried by said turret, whereby movement of the toggle in one direction causes in succession movement of said slide in one direction and pushing of said first die into cooperative relation to said second die and locking of said toggle to hold the first die in said cooperative relation, and actuating means on the frame at said third and fourth stations for moving said toggle in said direction and for unlocking said toggle to release said slide for movement of said first die into its normal position, respectively.

5. A machine as defined in claim 4 wherein there is a cradle fixedly mounted on said turret and in which said slide is slidable, the second-mentioned link of the toggle is a bellcrank pivoted between its arms on said pivot which is carried by said cradle, said rod of the mandrel has a collar fixed thereon, a pusher is adjustably mounted on said slide, and spring means relatively stronger than the first-mentioned and second-mentioned spring means are interposed between said pusher and said collar to cause the mandrel die to maintain constant substantially uniform pressure on the plastic material trapped in said cavity between the dies.

6. A machine as defined in claim 1 wherein said turret includes two rigidly spaced apart end plates connected by tie rods and journaled on said frame, there are a plurality of mandrels mounted on one end plate and movable in succession through said stations and each having a first punch die, a second cavity die for each first die having an arm pivotally mounted on a tie rod adjacent the other end plate providing for swinging of said arm to move the second die into and out of axial alignment with the corresponding first die, and wherein there is a spring normally biasing each arm to move said second die into alignment with the corresponding first die, and there is a cam on said frame and there is a part on each said arm coactive with said cam to momentarily move said second die out of axial alignment with the first die while the latter is at said first station.

7. A machine as defined in claim 6 wherein the means at the first station comprises a trough for holding a preformed tube in axial alignment with the mandrel at said first station, means for feeding thermoplastic tubes in succession to said trough in timed relation to the step-by-step rotation of said turret, and means for pushing a tube from said trough onto said mandrel while the mandrel is stationary at said first station.

8. A machine as defined in claim 1 wherein the means at said second station includes mechanism for feeding a ribbon of heat-softened thermoplastic material, apparatus for simultaneously cutting a slug from said ribbon and longitudinally moving said mandrel to push the end of said tube into encircling contact with said slug.

9. A machine as defined in claim 4 wherein said second die is formed to mold a screw-threaded neck on said end wall of the tube, and said mandrel body has a pulley coactive with a motor driven pulley at a fifth station for rotating the mandrel body and tube to unscrew said screw-threaded neck out of said second die.

10. A machine as defined in claim 9 with the addition of a roller spring-pressed into rollably engaging contact with said tube at said fifth station for holding said tube against rotation relatively to said mandrel.

11. A machine as defined in claim 9 with the addition of means at a sixth station for pulling said tube with the molded end wall off the mandrel, said means comprising a carrier block and means for reciprocating it on said frame toward and from said mandrel while said mandrel is stationary at said station, a pair of opposed fingers pivotally mounted on said carrier block and means for actuating said fingers to grip said screw-threaded neck between them upon movement of said fingers by said block in one direction into positions at opposite sides of said neck and to release said neck after movement of said fingers and said tube by the block a predetermined distance in the opposite direction.

12. A machine as defined in claim 10 wherein the axis of said spring-pressed roller is obliquely disposed with respect to the axis of the mandrel so that the roller tends to prevent relative longitudinal movement of the tube and the mandrel in the direction of movement of the first die into its said normal position.

13. A machine as defined in claim 5 wherein said actuating means at said third station comprises a push rod on said frame coactive with said bellcrank upon movement in one direction to swing the bellcrank and move said slide in the first-mentioned direction, and cam and lever mechanism operative in timed relation to the rotation of said turret for actuating said push rod.

14. A machine as defined in claim 5 wherein said actuating means at said fourth station includes a pull rod mounted on said frame and coactive with said bellcrank upon movement in one direction for momentarily actuating said bellcrank to unlock the toggle and release said slide for movement of said first die into its normal position, and cam and lever mechanism operative in timed relation to rotation of the turret for actuating said pull rod.

15. A machine as defined in claim 1 wherein each mandrel has an abutment for one end of the tube to limit sliding of the tube onto the mandrel and to provide for the projection of the other end of the tube outwardly beyond the free end of the first die on the mandrel, and wherein the means at the second station includes a belt for feeding a ribbon of heat-softened plastic material in spaced opposed relation to said die on the free end of the mandrel a platen abutting the side of the belt opposite said ribbon, a tubular cutter to telescopically receive said end of the tube, and means for moving the mandrel to push the end of the tube into said cutter for moving said cutter and said end of the tube through the portion of said ribbon abutting the platen to cut from said ribbon a slug which is encircled by and in contact with the tube.